(12) United States Patent
Jolfaei

(10) Patent No.: US 8,701,180 B2
(45) Date of Patent: Apr. 15, 2014

(54) SECURING COMMUNICATIONS BETWEEN DIFFERENT NETWORK ZONES

(75) Inventor: Masoud Aghadavoodi Jolfaei, Wiesloch (DE)

(73) Assignee: SAP AG, Walldorf (DE)

( * ) Notice: Subject to any disclaimer, the term of this patent is extended or adjusted under 35 U.S.C. 154(b) by 510 days.

(21) Appl. No.: 12/631,466

(22) Filed: Dec. 4, 2009

(65) Prior Publication Data

US 2011/0138457 A1 Jun. 9, 2011

(51) Int. Cl.
*H04L 29/06* (2006.01)

(52) U.S. Cl.
CPC .................................. *H04L 63/168* (2013.01)
USPC ........................................................ 726/14

(58) Field of Classification Search
None
See application file for complete search history.

(56) References Cited

U.S. PATENT DOCUMENTS

| 6,321,337 | B1 * | 11/2001 | Reshef et al. | ........... | 726/14 |
| 2003/0023873 | A1 * | 1/2003 | Ben-Itzhak | ........... | 713/201 |
| 2004/0001103 | A1 * | 1/2004 | Fliess et al. | ........... | 345/810 |
| 2009/0049539 | A1 | 2/2009 | Halbedel et al. | | |
| 2011/0055375 | A1 * | 3/2011 | Heim et al. | ........... | 709/224 |

OTHER PUBLICATIONS

"HOWTO: Tunneling HTTP over SSH with DD-WRT, DyDNS and putty", *Random Bits*,[Online]. Retrieved from the Internet: <URL: http://jstrassburg.blogspot.com/2006/01/howto-tunneling-http-over-ssh-with-dd.html>, (Jan. 31, 2006), 15 pgs.

* cited by examiner

*Primary Examiner* — David Pearson
(74) *Attorney, Agent, or Firm* — Schwegman, Lundberg & Woessner, P.A.

(57) ABSTRACT

In an embodiment, a method is provided for communicating a protocol request at a network zone. In this method, the protocol request is received from a computing device and this protocol request is encapsulated in a different protocol. The protocol request is then transmitted to a different network zone by way of the different protocol. A message is then accessed from the different network zone by way of the different protocol, and this message includes a protocol response to the protocol request. The protocol response is extracted from the message and transmitted to the computing device.

21 Claims, 10 Drawing Sheets

SECURING COMMUNICATIONS BETWEEN DIFFERENT NETWORK ZONES

FIELD

The present disclosure relates generally to computer network communication. In an embodiment, the disclosure relates to securing communication between different network zones.

BACKGROUND

Many Web applications hosted on a server (e.g., Web server) are accessible to the public by way of the Internet and also accessible privately by way of an intranet. To protect private data stored on the server, the server may employ firewalls or reverse proxies to block certain Hypertext Transfer Protocol (HTTP) requests used to attack the server. In general, HTTP is used to request and transmit data (e.g., Webpages and Webpage components) over the Internet or other computer networks. However, HTTP is an open standard protocol with well-known security leaks. As a result, an intruder can use such security leaks to access private data stored on a server that uses HTTP to access both private and public data.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Figure 1:
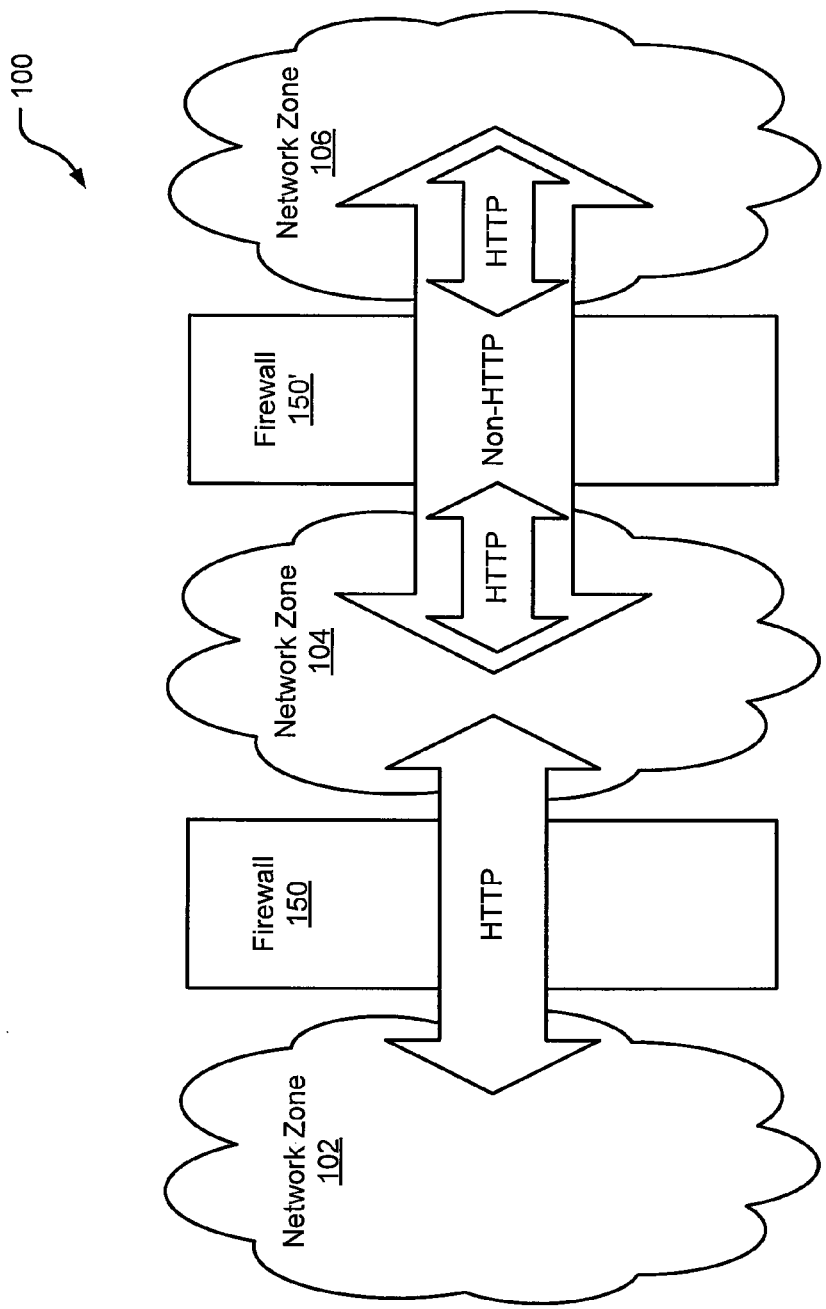
FIG. 1 depicts a block diagram of a system, consistent with one example embodiment, for securing communication between different network zones.

The embodiments described herein provide various techniques for securing communication between different network zones. Messages can be communicated between different network zones. For example, in one embodiment, systems located at different network zones can communicate by way of HTTP messages. As explained in more detail below, some of these network zones that use HTTP for communication can be secured by encapsulating the HTTP messages in non-HTTP protocols. As an example, FIG. 1 depicts a block diagram of a system 100, consistent with one example embodiment, for securing communication between different network zones. In this example, the system 100 includes three network zones 102, 104, and 106 that are separated by firewalls 150 and 150'. A "network zone," as used herein, refers to a physical or logical sub-network. A sub-network may refer to networked computing devices that have a common, designated IP address routing prefix. An example of a network zone is a domain, which is a collection of network nodes under the control of one or more entities that present a common routing policy. The firewalls 150 and 150' can be used to decouple one network zone from another network zone. For example, the firewall 150 is configured to decouple the network zone 102 from the network zone 104. Similarly, the firewall 150' is configured to decouple the network zone 104 from the network zone 106.

At the system 100, the network zone 102 is prevented from directly communicating with the network zone 106 through use of a common protocol, such as HTTP. In particular, embodiments of the present invention provide for a protocol switch between network zones 102, 104, and 106. Here, in one embodiment, the network zone 104 receives HTTP messages from the network zone 102 through the firewall 150. However, network zone 104 cannot directly communicate with network zone 106 through HTTP. Instead, as will be explained in more detail below, the HTTP messages received from the network zone 102 are communicated to the network zone 106 by way of a non-HTTP protocol. As a result, any access of resources (data and applications) at the network zone 106 does not use the same protocol as used for accessing resources at the network zone 104. This protocol "switch" may, for example, prevent an intruder from applying the same HTTP security leak used to access network zone 104 to access network zone 106. As a result, this protocol "switch" may result in more secure communication between, for example, the network zone 102 and network zone 106.

Figure 2:
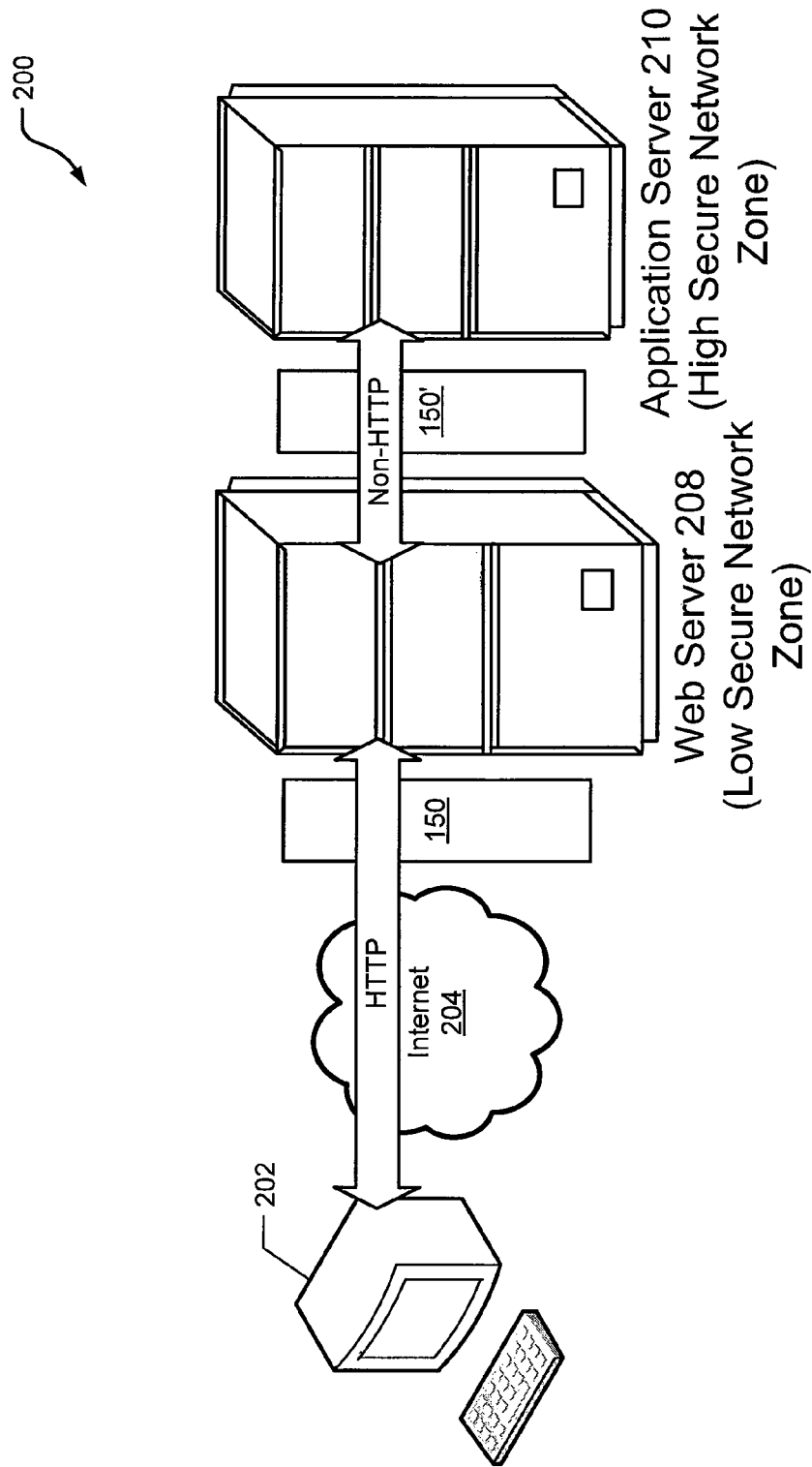
FIG. 2 depicts a diagram of a system, consistent with another example embodiment, for securing communication between different network zones.

FIG. 2 depicts a diagram of a system 200, consistent with another example embodiment, for securing communication between different network zones. In this example, the system 200 includes a client computing device 202 in communication with a Web server 208 by way of the Internet 204. In turn, the Web server 208 is in communication with an application server 210. Generally, the Web server 208 hosts and serves Web pages to client computing devices, such as the client computing device 202. Examples of the Web server 208 include Apache HTTP server, Microsoft Internet Information Services, and SAP NetWeaver Application Server. On the other hand, an application server 210 is a server that is designed for or dedicated to running specific applications.

Examples of the application server 210 include SAP NetWeaver Application Server, Advanced Business Application Programming (ABAP) Application Server, and Java Platform Enterprise Edition Server.

In the system 200, the Web server 208 is configured as a low secure network zone while the application server 210 is configured as a high secure network zone. For example, an organization may set up some Web applications at the Web server 208 that are accessible by way of the organization's internal network (e.g., intranet and local area network). Additionally, these same Web applications are also exposed to the Internet 204 for external access by client computing device 202. The organization may set up the different network zones 208 and 210 to prevent, for example, an intruder from accessing resources stored at the application server 210 using HTTP.

In particular, both the application server 210 and the Web server 208 are safeguarded by several firewalls 150 and 150', which decouple the high secure network zone from the low secure network zone and decouple the low secure zone from the Internet 204. The client computing device 202 is prevented from directly communicating with the application server 210 through the use of, for example, HTTP. Instead, embodiments of the present invention provide for a protocol "switch" between the Web server 208 and the application server 210. For example, the Web server 208 receives HTTP messages from the client computing device 202 through the firewall 150. As explained in more detail below, the Web server 208 then communicates the received HTTP messages to the application server 210 by way of a non-HTTP protocol. Vice versa, in one embodiment, HTTP messages transmitted from the application server 210 to the Web server 208 may be transmitted by way of the same non-HTTP protocol.

Figure 3:
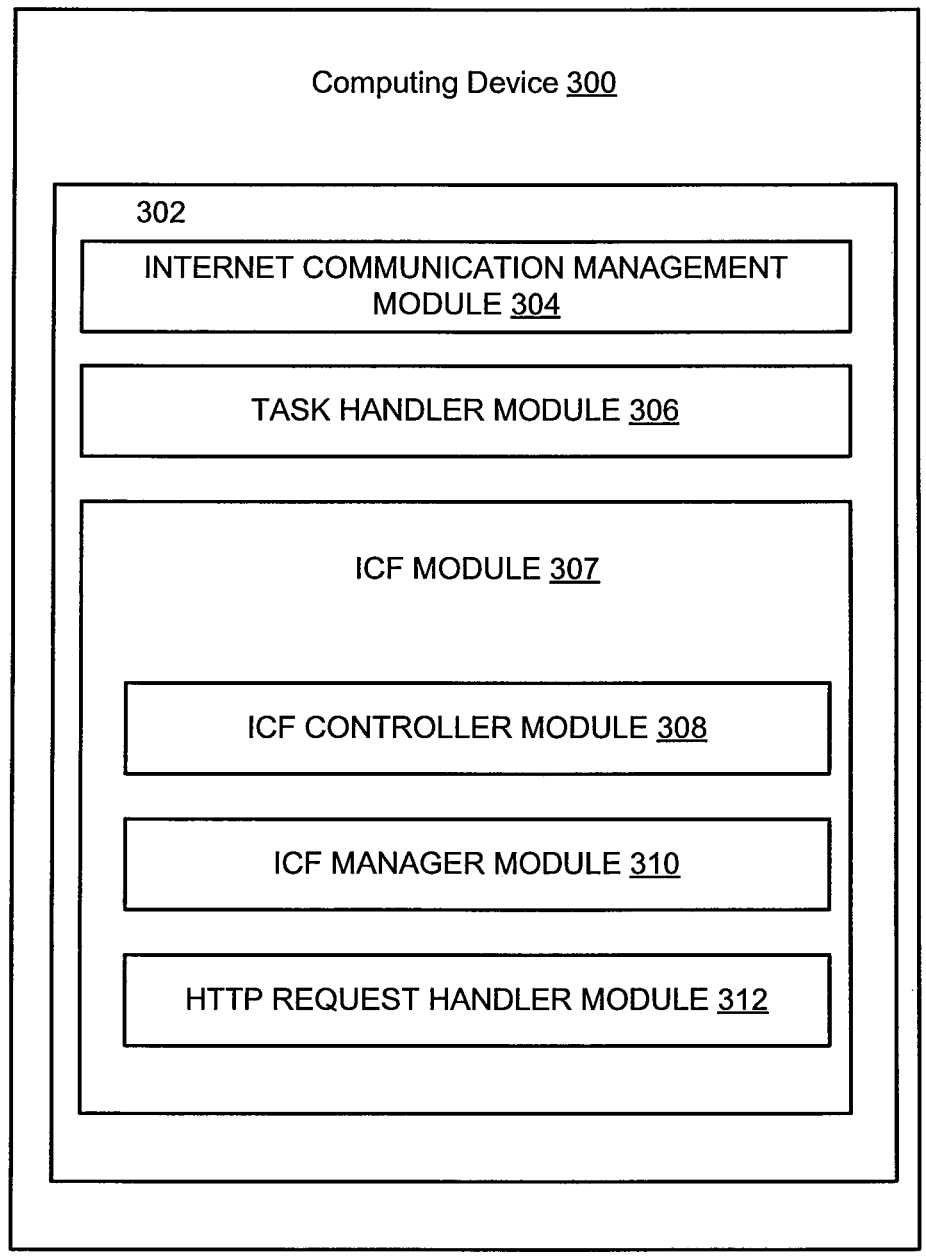
FIG. 3 depicts a block diagram of a server architecture, in accordance with an example embodiment, for securing communication between different network zones.

FIG. 3 depicts a block diagram of a server architecture, in accordance with an example embodiment, for securing communication between different network zones. This server architecture may be deployed at a computing device 300, and it should be appreciated that the computing device 300 may be deployed in the form of, for example, a server computer or other computing devices. The computing device 300 may be included in a networked system. For example, the computing device 300 may be the Web server 208 or the application server 210 depicted in FIG. 2. Referring to FIG. 3, in various embodiments, the computing device 300 may be used to implement computer programs, logic, applications, methods, processes, or software to secure communication between different network zones, as explained in more detail below.

In should be appreciated that the architecture of a server can be separated into different areas or layers (e.g., a presentation layer, integration layer, business layer, persistence layer, and connectivity layer). Embodiments of the present invention may be implemented at a connectivity layer 302 of the server architecture. In general, the connectivity layer provides the functionality to connect a server, as embodied in computing device 300, to a network infrastructure. In the example depicted in FIG. 3, the connectivity layer 302 includes an Internet communication management module 304, a task handler module 306, and an Internet communication framework (ICF) module 307. The ICF module 307 may include an ICF controller module 308, an ICF manager module 310, and an HTTP request handler module 312.

In general, the Internet communication management module 304 is configured to receive a request message, such as an HTTP request, from a client. An "HTTP request," refers to an HTTP message asking for information. Examples of HTTP requests include "GET," "POST," or other requests. The Internet communication management module 304 is configured to identify whether the resource identified by the Uniform Resource Locator (URL) is realized in, for example, an ABAP stack or a Java stack of an application server. If the application is identified as an ABAP application, for example, the Internet communication management module 304 forwards the HTTP request to a task handler module 306.

The ICF module 307 generally handles communication to and from other computing devices by way of HTTP, Hypertext Transfer Protocol Secure (HTTPS), Simple Mail Transfer Protocol (SMTP), and/or other communication protocols. For example, at a Netweaver ABAP Application Server, the ICF module 108 can be a part of a communication layer that provides client and server side communication on top of the HTTP/HTTPS/SMTP protocol. Upon receipt of the HTTP request, the task handler module 306 starts the ICF controller module 308, which transmits the HTTP request to the ICF manager module 310.

In one embodiment, as explained in more detail below, the ICF manager module 310 is configured to communicate HTTP messages to a different network zone by way of a non-HTTP protocol. The HTTP request handler module 312 then handles the HTTP request by transmitting the HTTP request to an application. The application may, for example, gather the requested data and transmit it back to the client through the ICF module 307 as a response. As explained in more detail below, this response may be an HTTP response or an HTTP response encapsulated in a non-HTTP protocol. An "HTTP response," as used herein, refers to an HTTP message generated in response to an HTTP request. An HTTP response may, for example, include the resource that was requested by the HTTP request. If the HTTP response is encapsulated in a non-HTTP protocol, another ICF module associated with a different network zone can be configured to extract the HTTP response from the non-HTTP message and forward the HTTP response to the client by way of HTTP. Given that embodiments of the invention may be embodied in the ICF module 108, the implementation of a "switch" (encapsulation and extraction) between protocols may not, for example, affect existing protocols (e.g., HTTP) supported by the ICF module 108. Rather, the implementation of the "switch" may include the addition of a different protocol (e.g., non-HTTP protocol) layer to the existing protocol layer.

It should be appreciated that in other embodiments, the computing device 300 may include fewer, more, or different modules apart from those shown in FIG. 3. For example, in an alternate embodiment, other standalone libraries and applications may be used to execute HTTP services by way of non-HTTP protocol. Examples of such libraries and applications include SAP Java connector, remote function call (RFC) library, and SAP business connector.

Figure 4:
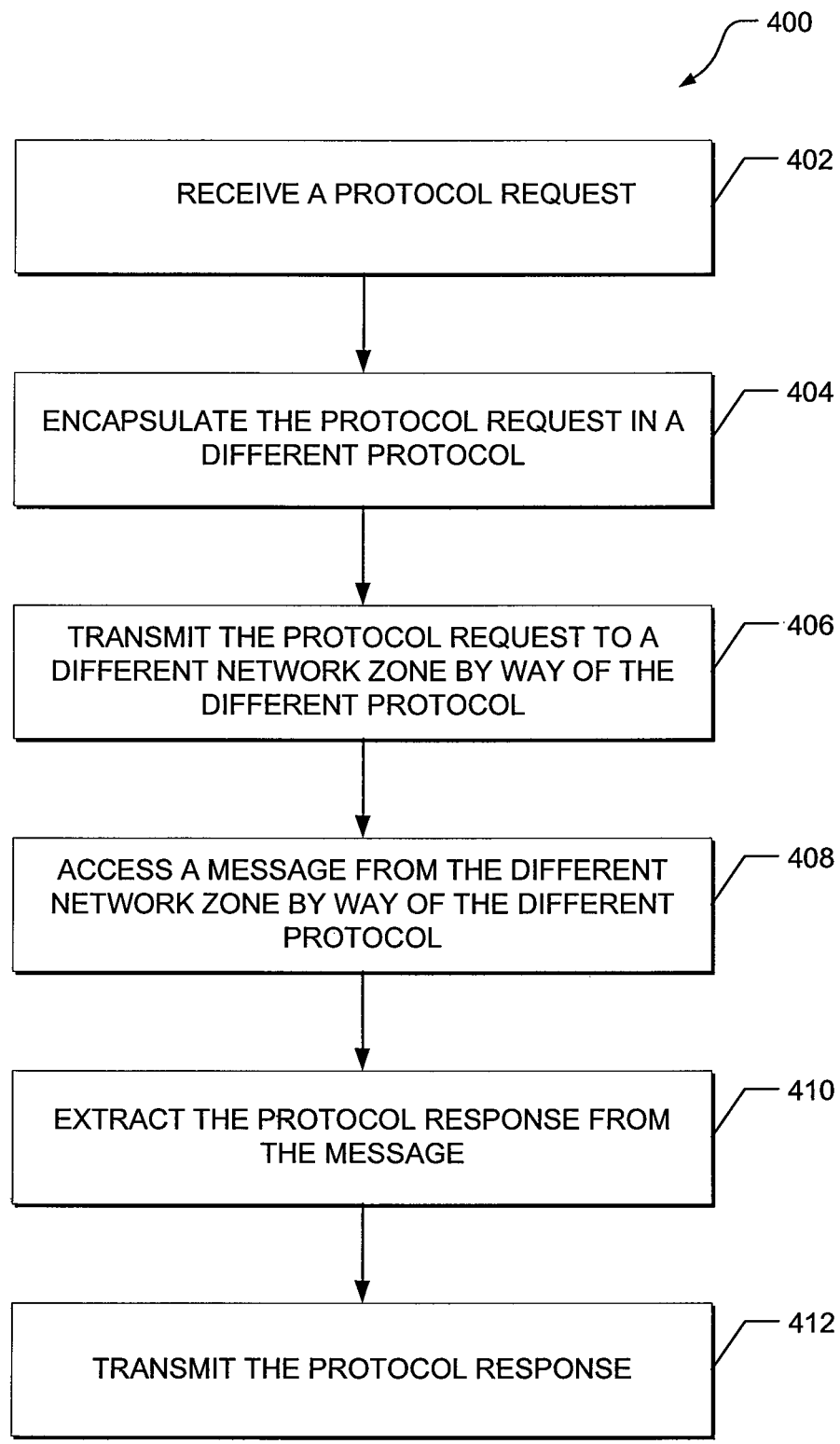
FIG. 4 depicts a flow diagram of a general overview of a method, in accordance with an example embodiment, for communicating protocol requests to a different network zone.

FIG. 4 depicts a flow diagram of a general overview of a method 400, in accordance with an example embodiment, for communicating protocol requests to a different network zone. In an example embodiment, the method 400 may be implemented by the ICF module 307 depicted in FIG. 3 and employed in a low secure zone, such as the Web server 208 depicted in FIG. 2. As depicted in FIG. 4, a protocol request is received at 402, and the received protocol request is then encapsulated in a different protocol 404. That is the request is communicated by a particular protocol (e.g., HTTP protocol), and the request is encapsulated in a different protocol (e.g., non-HTTP protocol). It should be appreciated that a "request" may also be referred to as a "protocol request," and therefore, the terms "request" and "protocol request" may be used interchangeably.

In general, encapsulation is the carrying of a datagram within another datagram. In other words, encapsulation is the inclusion of one data structure within another structure. In some examples, encapsulation may be the tunneling of payload (e.g., protocol request), which is formatted in a particular protocol, along a different protocol. For example, an HTTP request may be encapsulated in a non-HTTP message. In another example, a file transfer protocol (FTP) request may be encapsulated in a non-FTP message. In yet another example, a simple mail transfer protocol (SMTP) request may be encapsulated in a non-SMTP message. The various protocols that may be used in the communication and encryption of messages include HTTP, FTP, SMTP, remote function call (RFC), remote procedure call (RPC), SAP proprietary Diag channel (SAPGUI lib), file handling protocols (e.g., ABAP open dataset statements), and other protocols.

At 406, the protocol request is then transmitted to a different network zone (e.g., a high secure zone) by way of the different protocol. After transmission of the protocol request, a message may be accessed at 408 from this different network zone by way of the different protocol. As used herein, "accessing" a message includes, but is not limited to, receiving the message or reading the message from a storage medium. In one embodiment, as depicted in FIG. 4, the message in the different protocol encapsulates a protocol response to the protocol request, and this protocol response is extracted (or decapsulated) from the message at 410. Alternatively, in another embodiment, the protocol request may not be encapsulated in a different protocol, as explained in more detail below. It should be appreciated that a "response" may also be referred to as a "protocol response," and therefore, the terms "response" and "protocol response" may be used interchangeably. Additionally, it should be noted that the protocol response and the corresponding protocol request are formatted using the same protocol. This protocol response is then transmitted at 412 to, for example, a client by way of HTTP, which was originally used to communicate the protocol request.

Figure 5:
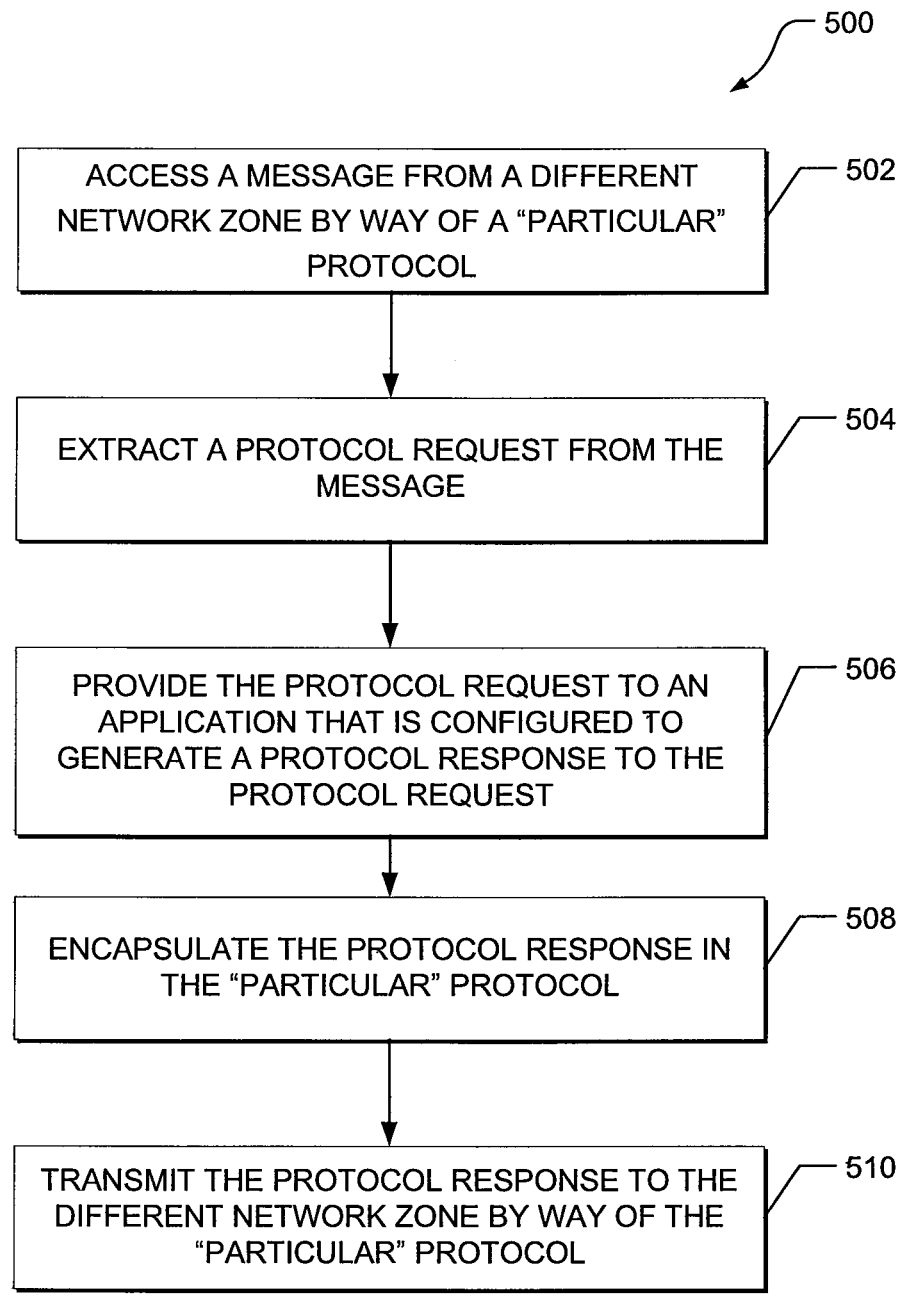
FIG. 5 depicts a flow diagram of a general overview of a method, in accordance with an example embodiment, for communicating protocol responses to a different network zone.

FIG. 5 depicts a flow diagram of a general overview of a method 500, in accordance with an example embodiment, for communicating protocol responses to a different network zone. In an example embodiment, the method 500 may be implemented by the ICF module 307 depicted in FIG. 3 and employed in a high secure zone, such as the application server 210 depicted in FIG. 2. As depicted in FIG. 5, a message is accessed at 502 from a different network zone by way of a protocol, namely a "particular" protocol. In this example, the message encapsulates a protocol request, which is formatted in a different protocol (or protocol that is different from the "particular" protocol). The protocol request is extracted from the message at 504, and this protocol request is provided to or transmitted to an application at 506, which is configured to process the protocol request and generate a protocol response to the protocol request.

In one embodiment, the protocol response is received from the application and then encapsulated at 508 in the "particular" protocol. The protocol response is then transmitted at 510 to the different network zone (e.g., a low secure network zone) by way of the "particular" protocol. In an alternate embodiment, the protocol response may not be encapsulated in a different protocol or the "particular" protocol. Instead, the protocol response is directly transmitted to this different network zone.

Figure 6A:
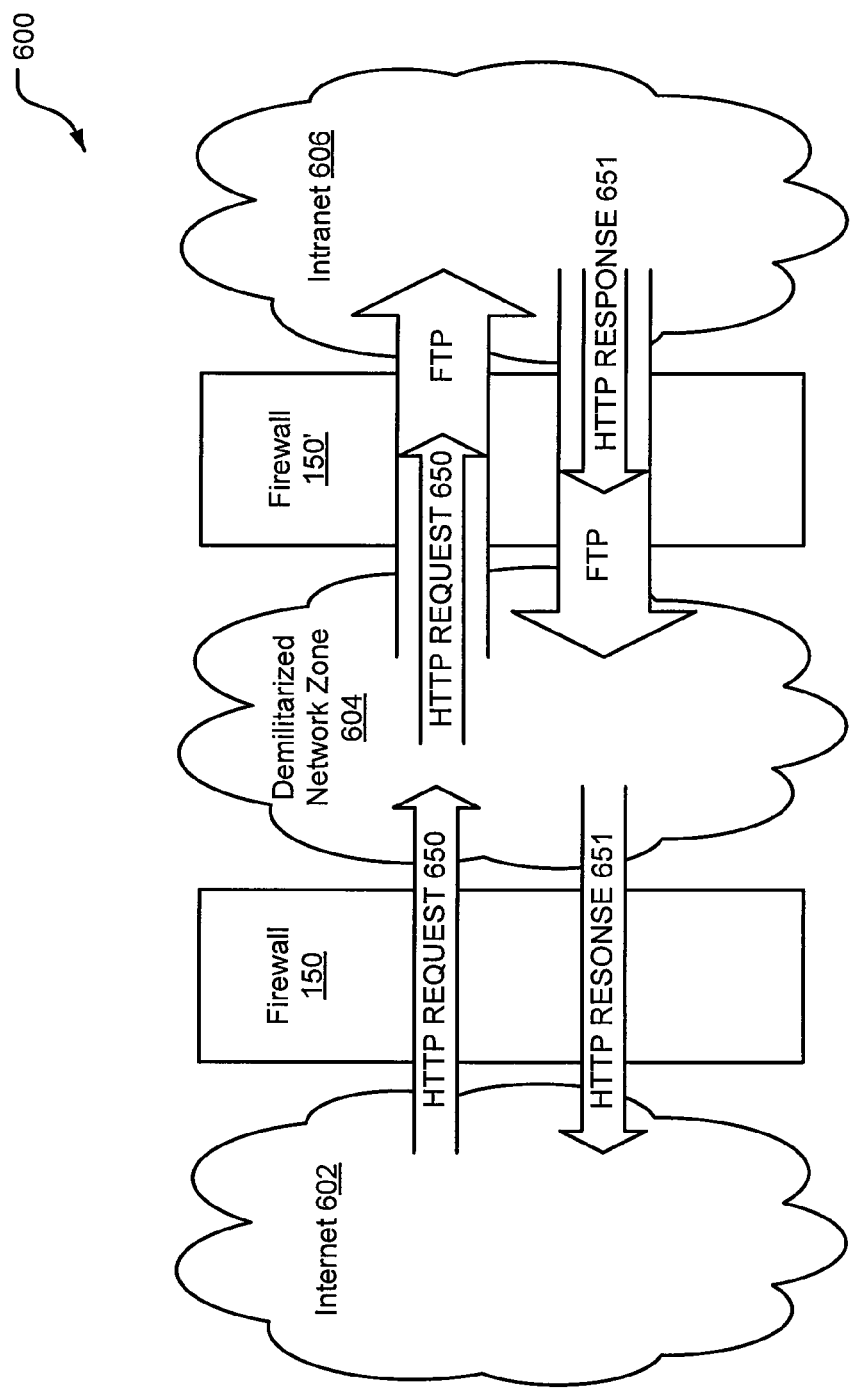
FIG. 6A depicts another example of a system, in accordance with an alternate example embodiment, illustrating the securing of communications between a demilitarized network zone and an intranet.

FIG. 6A depicts another example of a system 600, in accordance with an alternate example embodiment, illustrating the securing of communications between a demilitarized network zone 604 and an intranet 606. In this example, the system 600 includes three network zones, namely the Internet 602, a demilitarized network zone 604, and an intranet 606 that are separated by firewalls 150 and 150'. In general, a "demilitarized network zone," as used herein, refers to an isolated network zone that hosts resources made available to an untrusted network, such as the Internet 602. The demilitarized network zone 604 acts as a buffer zone between the intranet 606 that needs to be secure and the Internet 602, which may be hostile.

In the example system 600, some Web applications that are accessible by the intranet 606 are subject to a different security level than those applications that are accessible from the Internet 602. For example, these Web applications may be employment recruiting applications that allow employees of the organization to apply for job vacancies internally through the intranet 606 and also for external applicants to apply for the same job vacancies through the Internet 602. The demilitarized network zone 604 is created between the Internet 602 and the intranet 606 to prevent, for example, an intruder from using HTTP to directly access resources at the intranet 606.

The firewall 150 separating the Internet 602 from the demilitarized network zone 604 is configured to allow only HTTP messages to and from the demilitarized network zone 604. On the other hand, the firewall 150' separating the demilitarized network zone 604 from the intranet 606 is configured to allow only FTP messages to and from the intranet 606. Generally, FTP is a standard network protocol used to exchange and manipulate files over a computer network. As a result, the systems connected to the Internet 602 are prevented from directly communicating with the intranet 606 through the use of HTTP.

In particular, an HTTP request 650 is received from the Internet 602 at the demilitarized network zone 604. As an example, the HTTP request 650 may be a request to retrieve information about a particular job posting, which is stored at the intranet 606. Given that the demilitarized network zone 604 can only communicate with the intranet 606 by way of FTP, the HTTP request 650 is encapsulated and transmitted to the intranet 606 by way of FTP. As an example, the encapsulation may involve the opening of an FTP channel from the demilitarized network zone 604 to the intranet 606. The HTTP request may then be copied from the demilitarized network zone 604 to a shared hard drive or other shared storage mediums at the intranet 606 with the use of the FTP command "PUT." It should be appreciated that the system 600 may include a shared disk file system, which is a file system that is shared by multiple computing devices (e.g., computing devices in a storage area network). In a shared disk file system, multiple computing devices can simultaneously read data from and write data to the same file system with shared memory, shared hard drive, or other shared storage mediums. Here, communication between the demilitarized network zone 604 (a low secure network zone) and the intranet 606 (a high secure network zone) is handled through a shared disk file system. Particularly, in one embodiment, the HTTP request 650 can be transmitted to the intranet 606 by writing the HTTP request 650 (e.g., as a file) to the shared disk file system by way of FTP. It should be noted that the HTTP request 650 or other HTTP messages can be serialized into a variety of different file formats. As an example, the requests and responses may be serialized into a binary file. In another example, the requests and responses may be serialized into an extensible markup language (XML) file.

An ICF module at the intranet 606 can be configured to check the shared disk file system (or shared storage medium) at regular intervals for receipt of the HTTP request 650. After the HTTP request 650 is copied to the intranet 606, the FTP connection may be closed or terminated.

An application at the intranet 606 that processes the HTTP request 650 can retrieve the information about the particular job posting and include such information in an HTTP response 651. In one embodiment, this HTTP response 651 may be encapsulated and transmitted to the demilitarized network zone 604 by way of FTP. As an example, the encapsulation may involve the opening of another FTP channel from the intranet 606 to the demilitarized network zone 604. In a shared disk file system, the HTTP response 651 may be copied from the intranet 606 to a shared hard drive or other shared storage mediums at the demilitarized network zone 604 with the use of the FTP command "PUT." Particularly, in one embodiment, an ICF module at the intranet 606 can write the HTTP response 651 to the shared disk file system using FTP. Another ICF module at the demilitarized network zone 604 can receive this HTTP response 651 from the intranet 606 by reading the HTTP response 651 from the shared disk file system using FTP. In other words, a system at the demilitarized network zone 604 can be configured to check this shared hard drive at regular intervals for the receipt of the HTTP response 651, which is later transmitted to a requester of the information by way of the Internet 602.

Figure 6B:
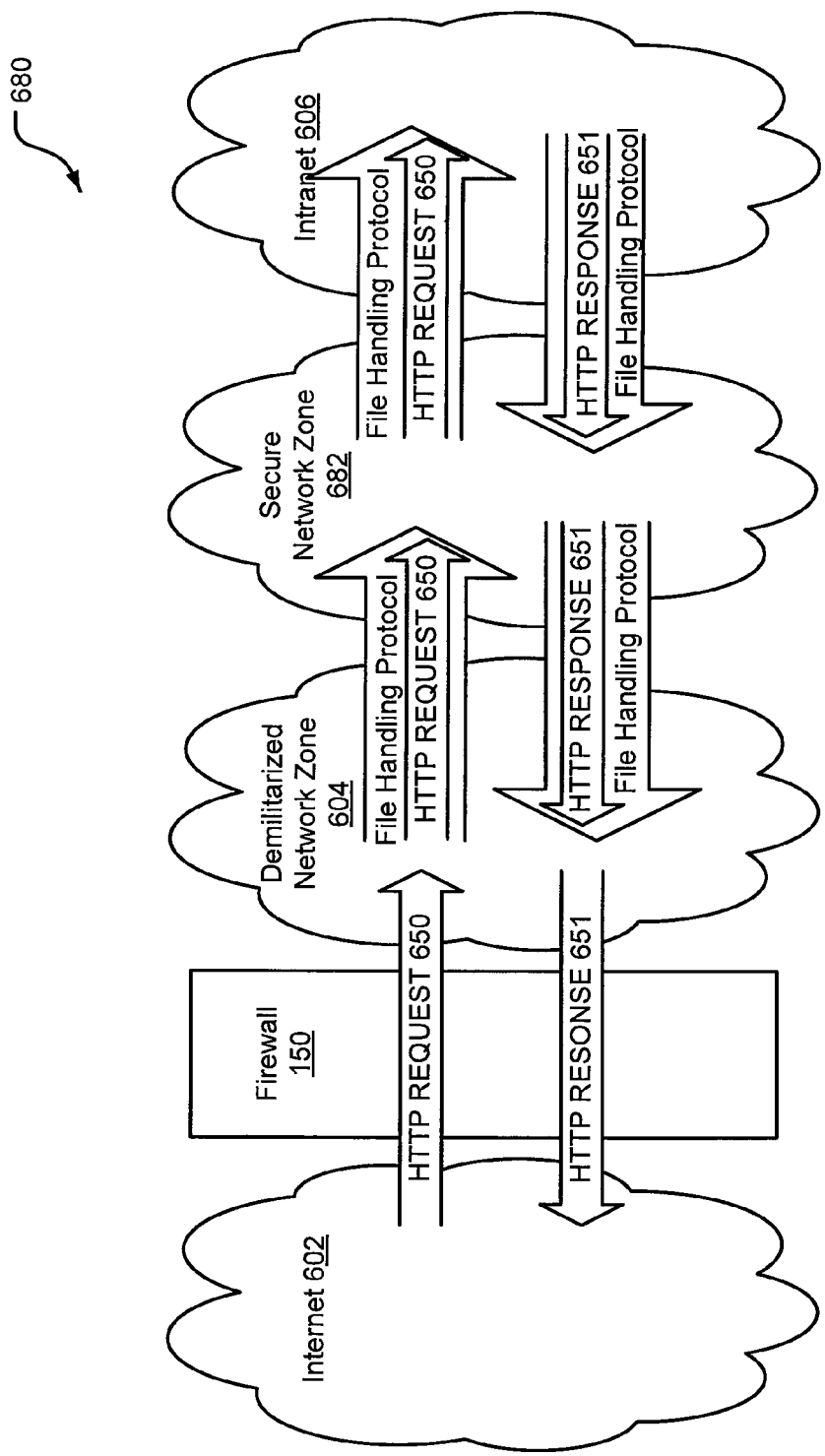
FIG. 6B depicts yet another example of a system, in accordance with another example embodiment, illustrating the securing of communications between a demilitarized network zone and an intranet by way of a file handling protocol.

FIG. 6B depicts yet another example of a system 680, in accordance with another example embodiment, illustrating the securing of communications between a demilitarized network zone 604 and an intranet 606 by way of a file handling protocol. In this example, the system 600 includes four network zones, namely the Internet 602, a demilitarized network zone 604, a secure network zone 682, and an intranet 606. The Internet 602 and the demilitarized network zone 604 are separated by a firewall 150. As discussed above, some Web applications that are accessible by the intranet 606 are subject to a different security level than those applications that are accessible from the Internet 602. The demilitarized network zone 604 is created between the Internet 602 and the intranet 606 to prevent, for example, an intruder from using HTTP to directly access resources at the intranet 606.

The firewall 150 separating the Internet 602 from the demilitarized network zone 604 is configured to allow only HTTP messages to and from the demilitarized network zone 604. Here, a shared hard drive or another shared storage medium is located in the secure network zone 682. In this alternate embodiment, an ICF module can copy the HTTP request 650 from the demilitarized network zone 604 to the shared storage medium at the secure network zone 682. This shared storage medium may be a part of a shared disk file system, which is discussed above, and may be mounted in a file server (e.g., \\<host>\>directory>) that is shared between systems located in the demilitarized network zone 604 and the intranet 606. This file server can be secured by user and/or password authentication.

In the embodiment of FIG. 6B, communication between the demilitarized network zone 604 and the intranet 606 is handled through a shared disk file system. Particularly, the HTTP request 650 can be transmitted to the secure network zone 682 by writing the HTTP request 650 to the shared storage medium at the secure network zone 682. As an example, the HTTP request 650 can be transmitted to the secure network zone 682 by writing the HTTP request 650 (e.g., as a binary or XML file) to the shared disk file system by way of a file handling protocol (e.g., ABAP open dataset statement). An ICF module at the intranet 606 can be configured to check the shared storage medium located at the secure network zone 682 at regular intervals for receipt of the HTTP request 650.

An application at the intranet 606 that processes the HTTP request 650 can generate an HTTP response 651. In one embodiment, this HTTP response 651 may be encapsulated and transmitted to the secure network zone 682 by way of the same file handling protocol. In a shared disk file system, the HTTP response 651 may be copied from the intranet 606 to the shared storage medium at the secure network zone 682. Particularly, in one embodiment, an ICF module at the intranet 606 can write the HTTP response 651 (e.g., as a binary or XML file) to the shared disk file system using an ABAP open dataset statement. Another ICF module at the demilitarized network zone 604 can access this HTTP response 651 from the secure network zone 682 by reading the HTTP response 651 from the shared disk file system using, for example, ABAP open dataset statement. That is, a system at the demilitarized network zone 604 can be configured to check this shared storage medium located at the secure network zone 682 at regular intervals for the receipt of the HTTP response 651.

Figure 7:
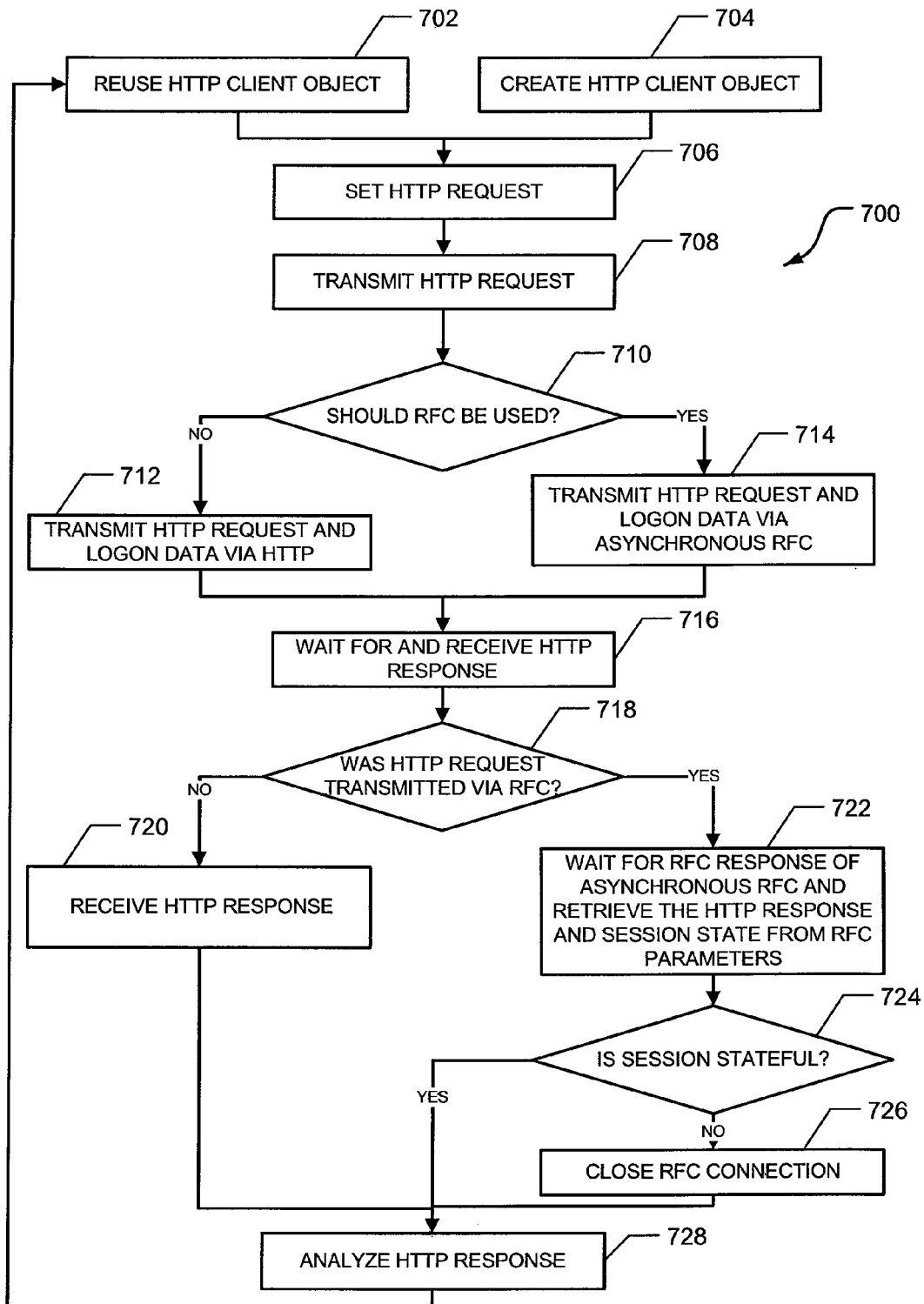
FIG. 7 depicts a flow diagram of a detailed method, in accordance with another example embodiment, of communicating HTTP requests to a different network zone.

FIG. 7 depicts a flow diagram of a detailed method 700, in accordance with another example embodiment, of communicating HTTP requests to a different network zone. In an example embodiment, the detailed method 700 may be implemented by the ICF module 307 depicted in FIG. 3 and employed in a low secure zone, such as the Web server 208 depicted in FIG. 2. In the example described in FIG. 7, a user may want to purchase certain items using an Internet commerce website. The user makes a selection at a Web browser and it generates an HTTP request (e.g., "POST") that includes the user's credit card number, which is to be stored at a high secure network zone. Here, the ICF module receives the HTTP request by way of the Internet and creates an HTTP client object at 704 based on the HTTP request. The ICF module then sets or initiates the HTTP request at 706 and transmits the HTTP request to a high secure network zone at 708.

Before the HTTP is transmitted, the ICF module at 710 checks whether the HTTP request should be transferred to the high secure network zone by way of HTTP or by way of a non-HTTP protocol, such as RFC. It should be noted that in some circumstances, the Web server may be configured to communicate with the high secure network zone directly by way of HTTP. If HTTP is used, the ICF module at 712 directly transmits the HTTP request with logon data to the high secure network zone by way of HTTP.

On the other hand, at 710, the HTTP request and logon data may be encapsulated and transmitted to the high secure network zone by way of RFC, in accordance with an alternate embodiment. Here, communication from a low secure network zone (e.g., demilitarized network zone) to the high secure network zone uses RFC instead of HTTP to access resources at the high secure network zone. RFC communication may require the usage of certain application programming interfaces in a particular order, such as RfcOpen including connection parameters, RfcCall including calling function module parameters, and RfcReceive including returning parameters of the function module. Accordingly, an intruder could possibly overtake control of some resources at the low secure network zone using HTTP, but he may not attack the systems residing at the high secure network zone using the same HTTP intrusion pattern. For example, the same HTTP intrusion pattern may not be used because an RFC module's IP address and port cannot be discovered by accessing and executing the RFC module.

After transmission of the HTTP request, the ICF module waits for and receives an HTTP response to the HTTP request at 716. In this example, the HTTP response may be a message confirming the sale of the item selected by a user. The ICF module then checks whether the original HTTP request was transmitted by way of RFC at 718. If the HTTP request is not transmitted by way of RFC, then the ICF module simply receives the HTTP response at 720.

However, if the original HTTP request was transmitted by way of RFC, then the ICF module extracts the HTTP response from the RFC parameters and transmits the HTTP response to the Web browser confirming the sale. In particular, the ICF module at 722 waits for RFC response of asynchronous RFC from the high secure network zone and retrieves the HTTP response and session state from the RFC parameters. It should be appreciated given HTTP communication is processed asynchronously, the RFC type "asynchronous RFC with response" can be used. Identification is then made at 724 of whether the session is stateful. In other words, a check can be made at 724 to determine whether the remote session should be kept alive. It should be noted that in stateful communication, all user activities in a session are performed in a single context (role area). As a result, for example, if the session is stateful, then all HTTP requests and responses are handled within a single session. If the session is not stateful, then the HTTP requests and responses are communicated over different sessions with different logons. In the example of FIG. 7, if the session is not stateful, then the RFC connection is closed at 726 after the HTTP response is transmitted from the high secure network zone.

The use of RFC to communicate HTTP messages may, for example, facilitate shortcomings of HTTP session management regarding HTTP stateful session handling. It should be noted that HTTP is a stateless protocol, and the stateless nature of HTTP may result in orphaned sessions, which may result in memory consumption (memory leak), additional system overload, and resource degradation. Given that RFC communication is stateful, RFC sessions are tightly coupled to the initiator of the sessions. Accordingly, abnormal termination of the initiator session also results in the termination of its RFC sessions and therefore, may not cause any orphaned sessions. Still referring to FIG. 7, the ICF module then analyzes the HTTP response at 728 and may then reuse the HTTP client object at 702 for the same session, if applicable.

Figure 8:
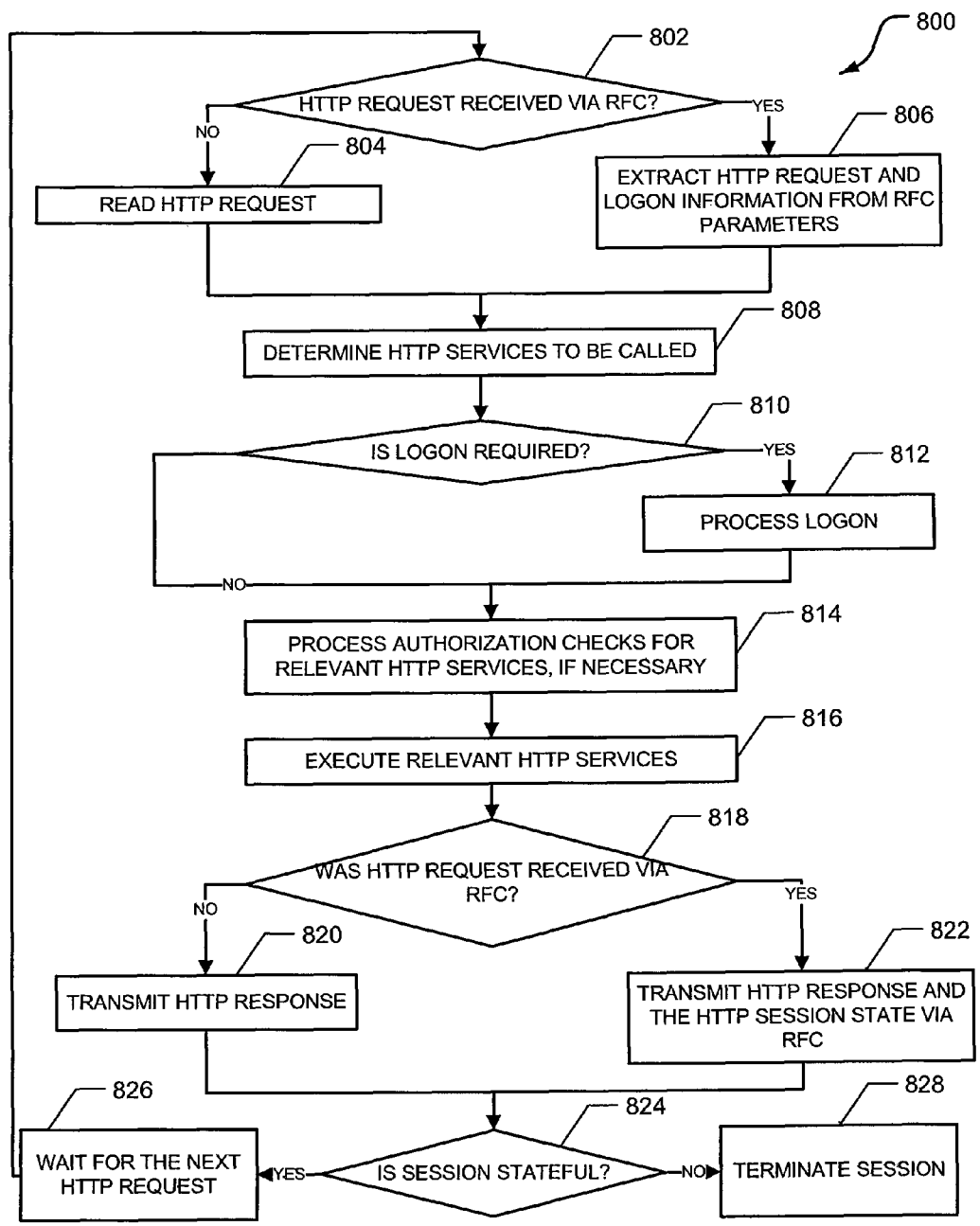
FIG. 8 depicts a flow diagram of a detailed method, in accordance with yet another example embodiment, for communicating HTTP responses to a different network zone.

FIG. 8 depicts a flow diagram of a detailed method 800, in accordance with yet another example embodiment, for communicating HTTP responses to a different network zone. In an example embodiment, the method 800 may be implemented by the ICF module 307 depicted in FIG. 3 and employed in a high secure zone, such as the application server 210 depicted in FIG. 2. In the example described in FIG. 8, the ICF at a high secure network zone receives an HTTP request and checks at 802 whether the HTTP request is received by way of RFC. If the HTTP request is received by way of RFC, then the HTTP request and logon information are extracted from the RFC parameters at 806. On the other hand, if the HTTP request is not received by way of RFC, then the HTTP request is directly read at 804.

At 808, a determination is made as to all the different HTTP services that are to be called to process the HTTP request. In addition, a determination is made at 810 whether logon is required. If logon is required, then it is processed at 812. It should be appreciated that there can be two different embodiments for applying the logon procedure. In one embodiment using an HTTP based logon, the RFC logon procedure is not applied. Instead, the required HTTP authentication procedure is applied. Therefore, all maintained logon information in HTTP destination (including an X509 client certificate) is transferred to the high secure network zone as RFC function module parameter in order to process the HTTP authentication accordingly. Furthermore, a Secure Network Communication (SNC) variant for a secure RFC communication can be used, if necessary. In an alternate embodiment, the maintained HTTP logon procedures may be replaced by RFC logon methods.

Still referring to FIG. 8, the ICF module at the high secure network zone processes the authorization checks for relevant HTTP services, if necessary, at 814, and the relevant HTTP services (e.g., ABAP applications) are executed at 816 to process the HTTP request. The ICF module then receives an HTTP response to the HTTP request and checks whether the original HTTP request was received by way of RFC at 818. If the HTTP request was not received by way of RFC, then the ICF module directly transmits the HTTP response at 820 to the low secure network zone. On the other hand, if the HTTP request was originally received by way of RFC, then the ICF module encapsulates the HTTP response and transmits the HTTP response and additional information, such as the HTTP session state, by way of RFC at 822.

After transmission of the HTTP response, the ICF module then determines whether the remote session is to be kept alive. Here, the ICF module checks whether the session is stateful 824. If the session is not stateful, then the session is terminated at 828. However, if the session is stateful, then the ICF module waits at 826 for the next HTTP request. Upon receipt of the next HTTP request, then the ICF module identifies again whether the HTTP request is received by way of RFC at 802.

Figure 9:
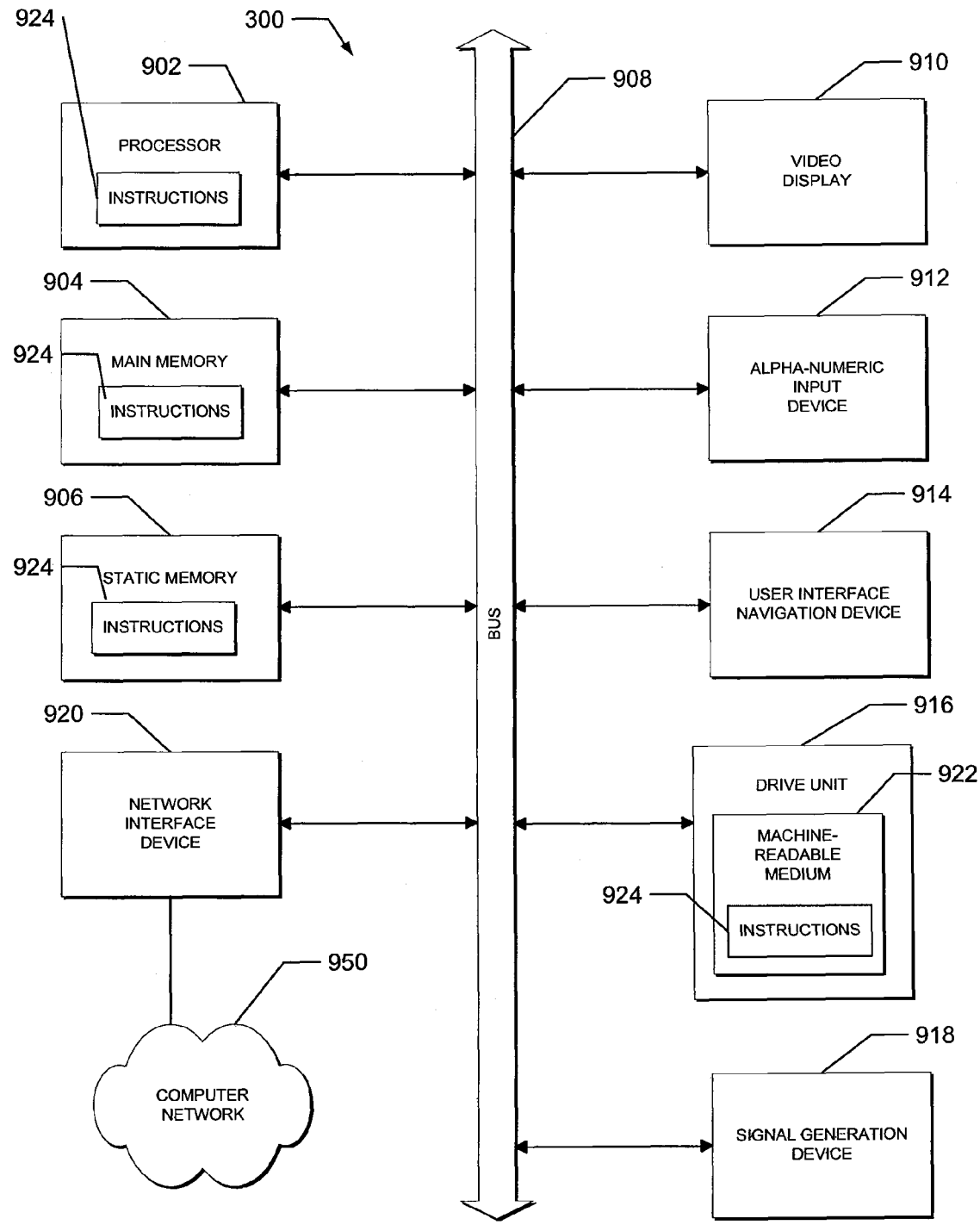
FIG. 9 depicts a block diagram of a machine in the example form of a computing device within which may be executed a set of instructions for causing the machine to perform any one or more of the methodologies discussed herein.

FIG. 9 depicts a block diagram of a machine in the example form of a computing device 300 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 300 includes a processor 902 (e.g., a central processing unit (CPU), a graphics processing unit (GPU) or both), a main memory 904 (e.g., random access memory (a type of volatile memory)), and static memory 906 (e.g., static random access memory (a type of volatile memory)), which communicate with each other via bus 908. The computing device 300 may further include video display unit 910 (e.g., a plasma display, a liquid crystal display (LCD) or a cathode ray tube (CRT)). The computing device 300 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by computing device 300, with the main memory 904 and processor 902 also constituting machine-readable, tangible media.

The data structures and instructions 924 may further be transmitted or received over a computer network 950 via network interface device 920 utilizing any one of a number of well-known transfer protocols (e.g., HTTP).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 300) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processor or processors 902 may be located in a single location (e.g., within a home environment, an office environment or as a server farm), while in other embodiments the processors 902 may be distributed across a number of locations.

While the embodiment(s) are described with reference to various implementations and exploitations, it will be understood that these embodiments are illustrative and that the scope of the embodiment(s) are not limited to them. In general, techniques securing communications may be implemented with facilities consistent with any hardware system or systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of communicating a protocol request at a network zone, the method comprising:
   receiving the protocol request from a computing device;
   encapsulating the protocol request in a different protocol;
   transmitting the encapsulated protocol request to a different network zone by way of the different protocol over a first communication channel;
   closing the first communication channel after transmitting the encapsulated protocol request;
   opening a second communication channel with the different network zone;
   checking by the network zone, a shared disk file system shared between the network zone and the different network zone for a message from the different network zone by way of the different protocol over the second communication channel;

accessing tail the message, the message including a protocol response to the protocol request;
extracting the protocol response from the message; and
transmitting the extracted protocol response to the computing device,
wherein the transmitting of the protocol request includes writing the protocol request to the shared disk file system by way of the different protocol, and wherein the accessing of the message from the different network zone includes reading the message from the shared disk file system by way of the different protocol.

2. The method of claim 1, wherein the protocol request is a Hypertext Transfer Protocol (HTTP) request and the protocol response is an HTTP response.

3. The method of claim 1, wherein the protocol request is communicated at a connectivity layer of a server architecture.

4. The method of claim 3, wherein the connectivity layer includes an Internet communication framework (ICF) module.

5. The method of claim 1, further comprising checking the shared disk file system at regular intervals for the receipt of the protocol response.

6. The method of claim 5, wherein the different protocol is a File Transfer Protocol (FTP).

7. The method of claim 1, wherein the different protocol is Simple Mail Transfer Protocol (SMTP).

8. The method of claim 1, wherein the different network zone is an intranet, and wherein the network zone is a demilitarized network zone.

9. A method of communicating a protocol response at a network zone, the method comprising:
accessing a message from a different network zone by way of a different protocol, the message including a protocol request over a first communication channel;
closing the first communication channel after accessing the message;
extracting the protocol request from the message;
providing the extracted protocol request to an application, the application configured to generate the protocol response to the protocol request;
encapsulating the protocol response in the different protocol;
opening a second communication channel with the different network zone;
transmitting the encapsulated protocol response to the different network zone by way the different protocol over the second communication channel,
wherein the network zone and the different network zone include a shared disk file system, wherein the accessing of the message from the different network zone includes reading the message from the shared disk file system by way of the different protocol over the first communication channel, and wherein the transmitting of the encapsulated protocol response includes writing the protocol response to the shared disk file system by way of the different protocol over the second communication channel.

10. The method of claim 9, wherein the protocol response is a Hypertext Transfer Protocol (HTTP) response and the protocol request is an HTTP request.

11. The method of claim 9, wherein the protocol response is communicated at a connectivity layer of a server architecture.

12. The method of claim 11, wherein the connectivity layer includes an Internet communication framework module.

13. The method of claim 9, wherein the different network zone is a demilitarized network zone, and wherein the network zone is a local area network.

14. A non-transitory machine-readable medium that stores instructions, which, when performed by a machine, cause the machine to perform operations comprising:
receiving a protocol request from a computing device;
encapsulating the protocol request in a different protocol;
transmitting, the encapsulated protocol request to a different network zone by way of the different protocol over a first communication channel;
closing the first communication channel after transmitting the encapsulated protocol request;
opening a second communication channel with the different network zone;
checking by the network zone, a shared disk file system shared between the network zone and the different network zone for a message from the different network zone by way of the different protocol over the second communication channel;
accessing all the message, the message including a protocol response to the protocol request;
extracting the protocol response from the message; and
transmitting the extracted protocol response to the computing device,
wherein the transmitting of the protocol request includes writing the protocol request to the shared disk file system by way of the different protocol, and wherein the accessing of the message from the different network zone includes reading the message from the shared disk file system by way of the different protocol.

15. A non-transitory machine-readable medium that stores instructions, which, when performed by a machine, cause the machine to perform operations comprising:
accessing a message from a different network zone by way of a protocol over a first communication channel, the message including a protocol request that is formatted in a different protocol;
closing the first communication channel after accessing the message extracting the protocol request from the message;
providing the extracted protocol request to an application, the application configured to generate the protocol response to the protocol request;
encapsulating the protocol response in the protocol;
opening a second communication channel with the different network zone;
transmitting the encapsulated protocol response to the different network zone by way of the protocol over the second communication channel,
wherein the network zone and the different network zone include a shared disk file system, wherein the accessing of the message from the different network zone includes reading the message from the shared disk file system by way of the different protocol over the first communication channel, and wherein the transmitting of the encapsulated protocol response includes writing the protocol response to the shared disk file system by way of the different protocol over the second communication channel.

16. A computing device comprising:
at least one processor; and
a memory in communication with the at least one processor, the memory being configured to store an application server and an application that are executable by the at least one processor, the application server having instructions that when executed by the at least one processor, cause operations to be performed, the operations comprising:
  accessing a message from a different network zone by way of a protocol, the message including a protocol request that is formatted in a different protocol over a first communication channel;
  closing the first communication channel;
extracting the protocol request from the message;
  providing the extracted protocol request to the application, the application configured to generate the protocol response to the protocol request;
  encapsulating the protocol response in the different protocol;
  opening a second communication channel with the different network zone;
  transmitting the encapsulated protocol response to the different network zone by way of the different protocol over the second communication channel,
wherein the network zone and the different network zone include a shared disk file system, wherein the accessing of the message from the different network zone includes reading the message from the shared disk file system by way of the different protocol over the first communication channel, and wherein the transmitting of the encapsulated protocol response includes writing the protocol response to the shared disk file system by way of the different protocol over the second communication channel.

17. The computing device of claim 16, wherein different network zone is a demilitarized network zone.

18. The computing device of claim 16, wherein the application server includes an Internet communication framework module, and the protocol request is extracted and the protocol response is encapsulated at the Internet communication framework module.

19. A computing device comprising:
at least one processor; and
a memory in communication with the at least one processor, the memory being configured to store an application server executable by the at least one processor, the application server having instructions that when executed by the at least one processor, cause operations to be performed, the operations comprising:
  receiving a protocol request from a further computing device;
  encapsulating the protocol request in, a different protocol;
  transmitting the encapsulated protocol request to a different network zone by way of the different protocol over a first communication channel;
  closing the first communication channel after transmitting, the encapsulated protocol request;
  opening a second communication channel with the network zone;
  checking by the network zone, a shared disk file system shared between the network zone and the different network zone for a message from the different network zone by way of the different protocol the second communication channel;
  accessing the message, the message including an protocol response to the protocol request;
  extracting the protocol response from the message; and
  transmitting the extracted protocol response to the further computing device,
  wherein the transmitting of the protocol request includes writing the protocol request to the shared disk the system by way of the different protocol, and wherein the accessing of the message from the different network zone includes reading the message from the shared disk file system by way of the different protocol.

20. The computing device of claim 19, wherein the application server includes an Internet communication framework (ICF) module, and wherein the instructions are included in the ICF module.

21. The computing device of claim 19, wherein the different protocol is a remote function call (RFC).

* * * * *